United States Patent
Ichikawa

(10) Patent No.: US 9,131,123 B2
(45) Date of Patent: Sep. 8, 2015

(54) DEVICE FOR MONITORING SURROUNDINGS OF VEHICLE AND METHOD FOR MONITORING SURROUNDINGS OF VEHICLE

(75) Inventor: Toru Ichikawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 13/635,834

(22) PCT Filed: Mar. 3, 2011

(86) PCT No.: PCT/JP2011/001237
§ 371 (c)(1),
(2), (4) Date: Sep. 18, 2012

(87) PCT Pub. No.: WO2011/114638
PCT Pub. Date: Sep. 22, 2011

(65) Prior Publication Data
US 2013/0009789 A1    Jan. 10, 2013

(30) Foreign Application Priority Data
Mar. 19, 2010    (JP) ................................. 2010-064423

(51) Int. Cl.
*G08G 1/00*    (2006.01)
*H04N 7/18*    (2006.01)
*B60R 1/00*    (2006.01)
*G08G 1/16*    (2006.01)

(52) U.S. Cl.
CPC  *H04N 7/183* (2013.01); *B60R 1/00* (2013.01); *G08G 1/166* (2013.01); *G08G 1/167* (2013.01); *B60R 2300/70* (2013.01); *B60R 2300/8093* (2013.01)

(58) Field of Classification Search
USPC ................................................ 340/901, 903
See application file for complete search history.

(56) References Cited

U.S. PATENT DOCUMENTS

| | | | |
|---|---|---|---|
| 7,324,013 B2* | 1/2008 | Esson | 340/903 |
| 2006/0287825 A1 | 12/2006 | Shimizu et al. | |
| 2007/0297064 A1* | 12/2007 | Watanabe et al. | 359/630 |
| 2008/0122604 A1* | 5/2008 | Hattori et al. | 340/441 |
| 2010/0201508 A1* | 8/2010 | Green et al. | 340/435 |

FOREIGN PATENT DOCUMENTS

| | | |
|---|---|---|
| JP | 2001-006097 A | 1/2001 |
| JP | 2002-316603 A | 10/2002 |
| JP | 2002-327470 A | 11/2002 |
| JP | 2005-138720 A | 6/2005 |
| JP | 2007-076496 A | 3/2007 |
| JP | 2007-278911 A | 10/2007 |
| JP | 2008-040974 A | 2/2008 |
| JP | 2009-061962 A | 3/2009 |

OTHER PUBLICATIONS

International Search Report for PCT/JP2011/001273 dated May 31, 2011.

* cited by examiner

*Primary Examiner* — Brian Zimmerman
*Assistant Examiner* — Thomas McCormack
(74) *Attorney, Agent, or Firm* — Pearne & Gordon LLP

(57) ABSTRACT

Provided is a method for monitoring the surroundings of a vehicle, with which vehicle driving safely can be improved. The disclosed method for monitoring the surroundings of a vehicle involves: a step (S1100: YES; S1400) of activating a notification section that gives off an alarm to the driver of the vehicle when the vehicle starts to move; and a step (S1400) of displaying, on a screen inside the vehicle, a display item that accepts an operation for cancelling the alarm, as well as a image which is based on captured video-image data of the surroundings of the vehicle, when the vehicle starts to move.

8 Claims, 3 Drawing Sheets

DEVICE FOR MONITORING SURROUNDINGS OF VEHICLE AND METHOD FOR MONITORING SURROUNDINGS OF VEHICLE

TECHNICAL FIELD

The present invention relates to an apparatus and method of monitoring surrounds of a vehicle for monitoring obstacles in the surrounds of the vehicle using images captured with a vehicle-mounted camera.

BACKGROUND ART

With the increasing social needs for safety and feeling of safety during vehicle driving, what has become common practice in recent years is capturing images of the area behind a vehicle with a vehicle-mounted camera and displaying the images on a screen such as a monitor to show the images to a driver. This enables the driver to check, in the images, the state of the area behind the vehicle, which is likely to be a blind area, and determine the presence or absence of obstacles such as pedestrians. This reduces the number of accidents occurring when vehicles moves backward.

In that case, however, when the driver misses obstacles in the captured images or fails to check the captured images, the driver may move the vehicle backward without noticing obstacles appearing in the captured images.

To overcome the above problem, for example, PTLs 1 and 2 discloses apparatuses that issue an alert to instruct a driver to sec the screen displaying captured images upon detecting obstacles appearing in the captured images. The apparatuses disclosed in PTLs 1 and 2 (hereinafter referred to as "conventional apparatuses") detect an obstacle by, for example, image recognition or position detection when the obstacle appears in the captured images. Upon detecting the obstacle in the captured images, the conventional apparatuses issue an alert to the driver by sounding an alarm or automatically stopping the vehicle until the driver makes some designated operation through the screen displaying the captured images. With this configuration, the conventional apparatuses can surely prompt the driver to check the captured images upon detecting the obstacle in the captured images.

CITATION LIST

Patent Literature

PTL 1
Japanese Patent Application Laid-Open No. 2008-40974
PTL 2
Japanese Patent Application Laid-Open No. 2007-6496

SUMMARY OF INVENTION

Technical Problem

In the conventional techniques, however, no alert is issued to the driver when the apparatus fails to detect obstacles. Hence, with the conventional techniques, the driver may move the vehicle backward even when an obstacle is present behind the vehicle.

It is an object of the present invention to provide an apparatus and method of monitoring surrounds of a vehicle that can ensure the safe operation of the vehicle.

Solution to Problem

An apparatus for monitoring surrounds of a vehicle according to the present invention, the apparatus includes a report output section that activates a report section that issues an alert to a driver of the vehicle when the vehicle starts to move; and a control section that causes a display item and images to be displayed together on a screen in the vehicle when the vehicle starts to move, the display item being displayed to receive a cancelling operation of the alert, the images being based on captured image data of the surrounds of the vehicle.

A method of monitoring surrounds of a vehicle according to the present invention, the method includes: activating a report section that issues an alert to a driver of the vehicle when the vehicle starts to move; and causing a display item and images to be displayed together on a screen in the vehicle when the vehicle starts to move, the display item being displayed to receive a cancelling operation of the alert, the images being based on captured image data of the surrounds of the vehicle.

Advantageous Effects of Invention

According to the present invention, the system enables a driver to confirm captured images when the driver starts to move a vehicle, thus ensuring the safe operation of the vehicle.

SOLUTION TO PROBLEM

An embodiment of the present invention will now be described in detail with reference to the accompanying drawings.

Figure 1:
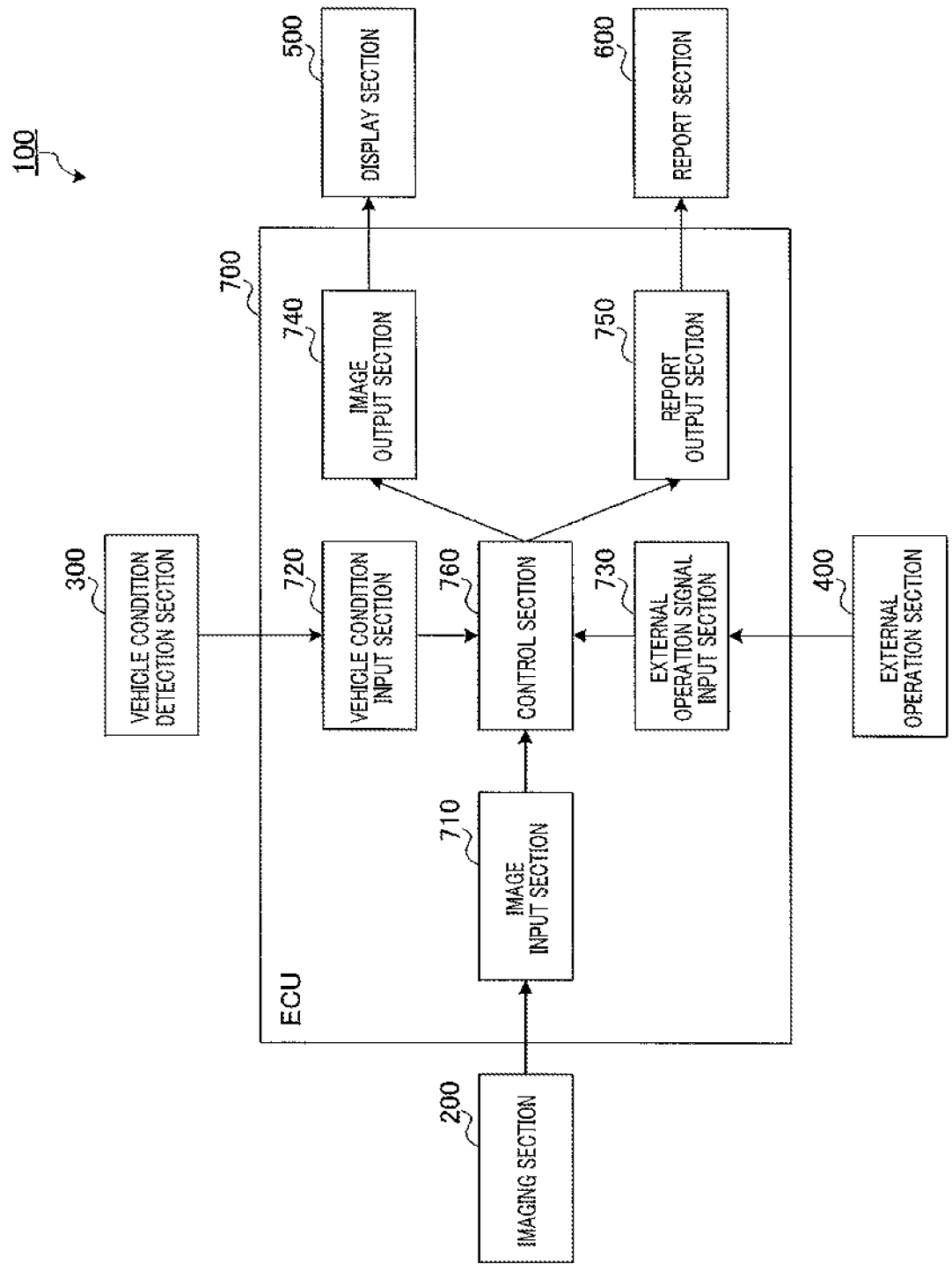
FIG. 1 is a block diagram illustrating a monitoring system of surrounds of a vehicle according to an embodiment of the present invention.

FIG. 1 is a block diagram illustrating a configuration of a monitoring system of surrounds of a vehicle including an apparatus for monitoring surrounds of a vehicle according to an embodiment of the present invention. The present embodiment is an example in which the present invention is applied to an electronic control unit (ECU) for a vehicle-mounted camera that is mounted inside a vehicle.

With reference to FIG. 1, monitoring system 100 of surrounds of a vehicle includes imaging section 200, vehicle condition detection section 300, external operation section 400, display section 500, report section 600, and ECU 700.

Imaging section 200 takes images of surrounds of a vehicle and outputs image signals of the captured images (hereinafter referred to as "captured image signals") to ECU 700 (described later) according to a predetermined scheme (for example, NTSC). Specifically, imaging section 200 is, for example, a vehicle-mounted camera mounted at the rear of the vehicle and is a digital video camera including a charge coupled devise (CCD) image sensor or a complementary metal oxide semiconductor (CMOS) image sensor.

Vehicle condition detection section 300 detects backward movement of a vehicle and outputs a vehicle state signal indicating the backward movement of the vehicle to ECU 700 (described later). Vehicle condition detection section 300 also detects the completion of the backward movement of the vehicle and outputs another vehicle state signal indicating the completion of the backward movement (hereinafter referred to as "cancel of backward movement") to ECU 700 (described later).

Specifically, vehicle condition detection section 300 is a shift position detecting device, for example. In this case, vehicle condition detection section 300 outputs the vehicle state signal indicating the backward movement of the vehicle while the shift lever is being switched to the reverse position. Then, vehicle condition detection section 300 outputs the vehicle state signal indicating the cancel of backward movement when the shift lever is switched to any position other than the reverse position. Vehicle condition detection section 300 includes, for example, a combination of a shift changer and an accelerator depressing detector. In this case, vehicle condition detection section 300 outputs the vehicle state signal indicating the backward movement of the vehicle when the shift lever is in the reverse position and when the power for depressing the accelerator or the displacement of the depressed accelerator is a predetermined level or higher. Alternatively, vehicle condition detection section 300 is an accelerometer or a vehicle speed meter, for example. In this case, vehicle condition detection section 300 outputs the vehicle state signal indicating the backward movement of the vehicle when a measured value indicating the backward movement of the vehicle is a predetermined value or greater.

External operation section 400 receives an input operation from a driver and outputs an operation signal indicating the operation to ECU 700 (described later). External operation section 400 is a touch panel of, for example, a resistive film type, analog capacitive type, and ultrasonic elastic wave type that is arranged on the screen of display section 500 (described later).

Display section 500 receives display image signals (described later) from ECU 700 and causes images to appear on the screen according to the received display image signals. Display section 500 is a touch panel monitor including the above touch panel (external operation section 400) arranged on a liquid crystal display screen, the touch panel monitor being mounted near the driver seat in the vehicle, for example. Display section 500 may also function as a display of a vehicle-mounted television set.

Report section 600 receives a reporting signal (described later) from ECU 700 and issues an alert to the driver (report of danger, hereinafter simply referred to as "alert") according to the input reporting signal. Report section 600 includes a buzzer or a loudspeaker and outputs a sound as an alert. That is, start of alert refers to start of sound output or setting of start of sound output after a predetermined time. Cancel of alert refers to setting of non-start of sound output or stop of output of sound that has been started.

ECU 700 causes display section 500 to display images of the area behind the vehicle that are captured by imaging section 200 (hereinafter simply referred to as "captured images"). Then, upon detecting the movement of the vehicle, ECU 700 activates the buzzer or loudspeaker of report section 600 and causes the captured images and a display item to appear on the screen of display section 500, the display item prompting the driver to operate to cancel the alert. This means that ECU 700 does not cancel the alert issued to the driver until it receives driver's operation to cancel the alert on the screen displaying the captured images.

ECU 700 includes image input section 710, vehicle condition input section 720, external operation signal input section 730, image output section 740, and report output section 750 as interfaces that can be connected to the external apparatuses described above. Furthermore, ECU 700 includes control section 760, a core calculation section that performs a determination process and controls these interface to issue the alert.

Image input section 710 receives the captured image signals from imaging section 200, decodes the received image signals into data having a format applicable to a process in control section 760, such as ROB and YUV, and stores the data in the internal memory. The decoded data (hereinafter referred to as "captured image data") is composed of data of multiple time-sequence image frames.

Vehicle state input section 720 receives the vehicle state signal from vehicle condition detection section 300, converts the received vehicle state signal into a signal applicable to the process in control section 760, and outputs the signal to control section 760.

External operation signal input section 730 receives the operation signal from external operation section 400, converts the received operation signal into a signal applicable to the process in control section 760, and outputs the signal to control section 760.

Image output section 740 converts the display image signals (described later) received from control section 760 into signals applicable to the process in display section 500 and outputs the signals to display section 500.

Upon receiving the reporting signal (described later) from control section 760, report output section 750 instructs report section 600 to start or cancel the alert.

Control section 760 acquires the captured image data from image input section 710 and outputs the data as display image signals to image output section 740 to cause display section 500 to display the captured image:. Control section 760, upon receiving the vehicle state signal indicating the backward movement of the vehicle from vehicle condition input section 720, outputs a reporting signal giving an instruction on start of alert to report output section 750 to cause report section 600 to issue an alert. Control section 760 superimposes an image of a confirmation button (display item) on the captured images. Then, upon receiving the operation signal indicating that the confirmation button has been pressed on the screen of display section 500 from external operation signal input section 730, control section 760 outputs a reporting signal giving an instruction on the cancel of alert to output section 750 to cause report section 600 to cancel the alert.

ECU 700 may be configured by, for example, a central processing unit (CPU), a storage medium such as a read only memory (ROM) storing a control program, a working memory such as a random access memory (RAM), and a storage medium for storing various pieces of data such as a hard disk, and a communication circuit. In that case, the above-described functions of ECU 700 can be achieved by a control program performed by the CPU.

Monitoring system 100 of surrounds of a vehicle having such a configuration causes the confirmation button to appear on the screen displaying the captured images when a vehicle starts to move backward, and issues an alert to the driver until the driver presses the confirmation button on the screen. Hence, to move the vehicle backward, the driver must watch the screen displaying the captured images and press the confirmation button to cancel the alert. With this configuration, monitoring system 100 of surrounds of a vehicle forces the driver to always confirm the captured images, thus ensuring the safe operation of the vehicle.

The operation of ECU 700 will now be explained.

Figure 2:
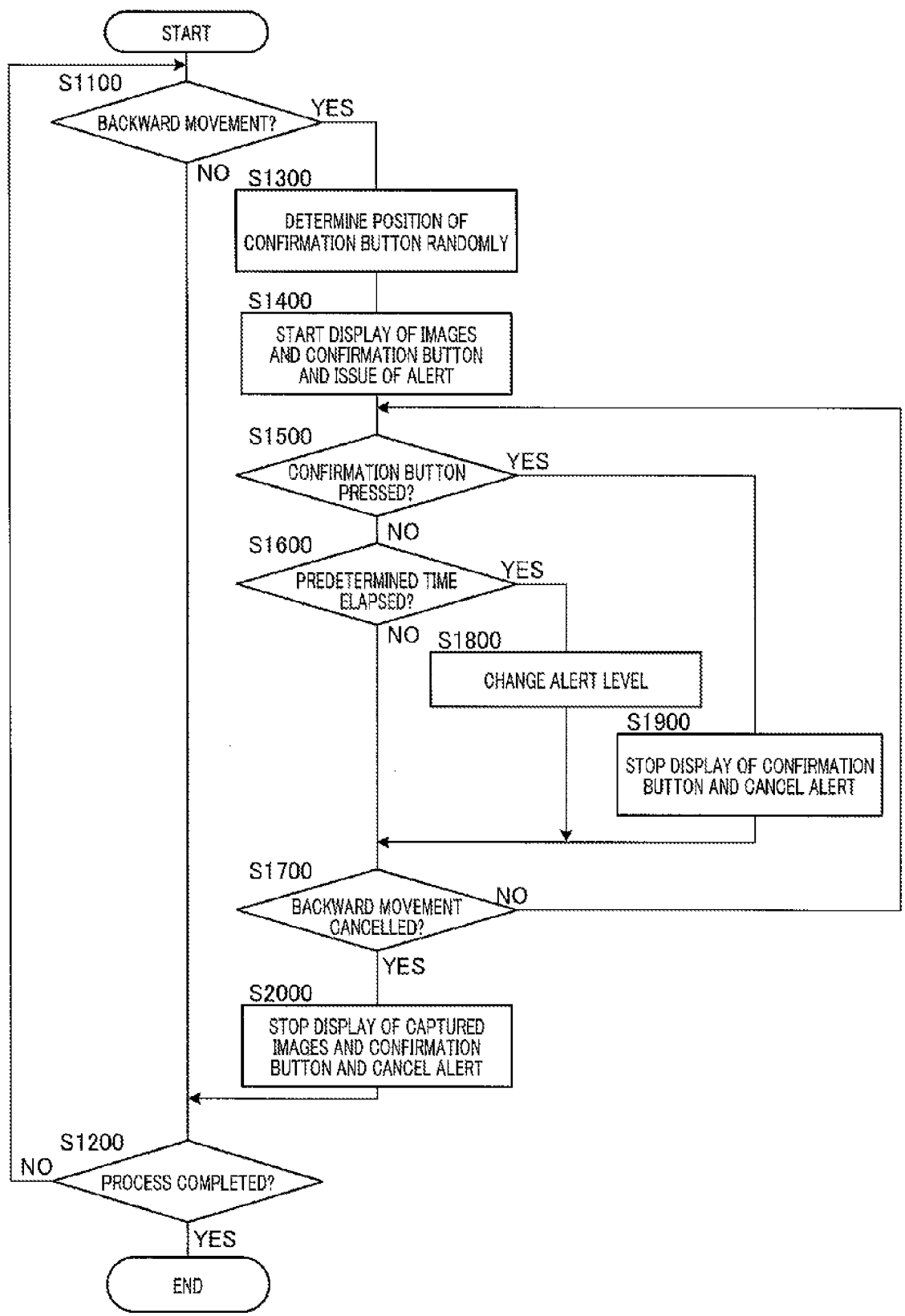
FIG. 2 is a flowchart illustrating an operation of an ECU according to the embodiment.

FIG. 2 is a flowchart illustrating the operation of ECU 700.

In step S1100, ECU 700 determines whether the vehicle starts to move backward. That is, ECU 700 determines, in control section 760, whether ECU 700 has received the vehicle state signal indicating the backward movement of the vehicle. If the vehicle does not start to move backward (S1100: NO), ECU 700 proceeds to step S1200. If the vehicle starts to move backward (S1100: YES), ECU 700 proceeds to step S1300.

In step S1200, ECU 700 determines whether the instruction of completion of process has been input by the user through, for example, the power off operation. If ECU 700 does not receive the instruction on the completion of process from the user (S1200: NO), the process returns to step S1100 to continue the monitoring of the backward movement of the vehicle.

In step S1300, ECU 700 determines the position of the confirmation button at random for the following reason. Fixing the position at which the confirmation button appears on the screen all the time causes the driver to be accustomed to the position, which then may cause the driver to press the confirmation button without watching the captured images behind the button. Setting the position of the confirmation button at random enables a driver to watch the screen more carefully.

ECU 700 may detect some obstacle in the captured images and, upon detecting the obstacle, may cause the confirmation button to appear near the obstacle in the captured images. In this case, ECU 700 performs, for example, image recognition and position detection on the captured images in control section 760 to determine the position of the obstacle in the captured images, and then determines the position of the confirmation button in the vicinity of the position of the obstacle. This enables the driver to easily notice the obstacle, thus decreasing the probability that the driver misses the obstacle.

In step S1400, ECU 700 starts to display the images and the confirmation button and issue an alert. That is, ECU 700 acquires the captured image data, outputs the display image signals indicating the captured images with the image of the confirmation button superimposed at the position determined in step S1300, and outputs the reporting signal giving an instruction on the start of the alert in control section 760. The order of start of the alert and display of the confirmation button is changeable. Furthermore, ECU 700 can appropriately determine the order of the issue of an alert sound and the display of the confirmation button. Taking into consideration the case where a driver confirms the captured images before an alert is issued, ECU 700 preferably outputs an alert sound after a predetermined time, for example, about two seconds, after the confirmation button is displayed.

Figure 3:
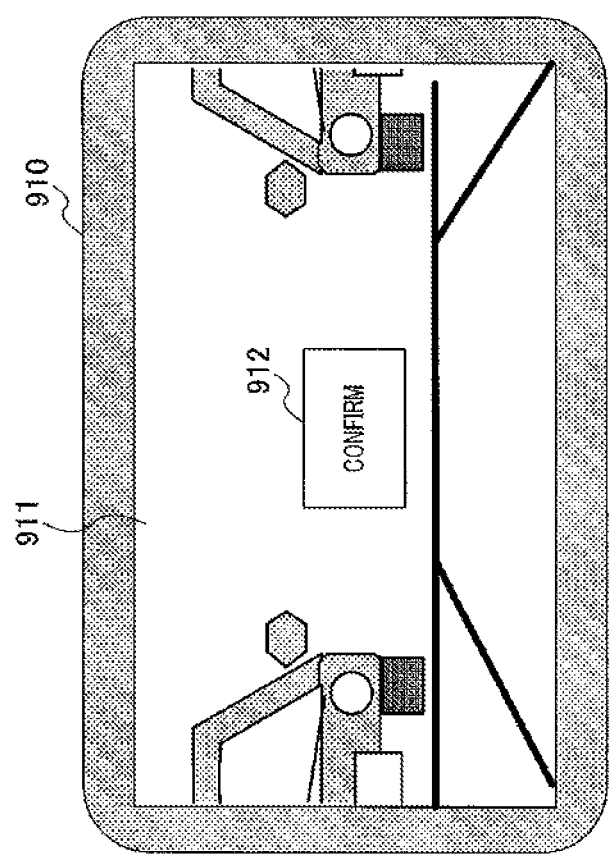
FIG. 3 illustrates an exemplary screen according to the embodiment.

FIG. 3 illustrates an exemplary screen of display section 500.

As shown in FIG. 3, captured images 911 and confirmation button 912 superimposed on captured images 911 are displayed on screen 910 of display section 500. Confirmation button 912 preferably does not interfere with captured images 911 where possible. For example, the image of confirmation button 912 may be transparent as shown in FIG. 3. With confirmation button 912 and the pressing operation by the touch panel, monitoring system 100 of surrounds of a vehicle enables a driver to confirm the captured images while reducing the burden of operation by the driver without a reduction in the visibility of the captured images.

ECU 700 may perform a viewpoint conversion process on the captured images when necessary. For example, in the case where the vehicle-mounted camera is settled at a high position of the rear of the vehicle so as to get a downward view, ECU 700 maps captured images on a space model in control section 760 to generate images showing the mapped images viewed from the virtual viewpoint at the height of the driver's viewpoint. This enables the driver to recognize the status of the area behind the vehicle more precisely.

In step S1500 of FIG. 2, ECU 700 determines whether the confirmation button has been pressed on the screen. That is, ECU 700 determines whether an operation signal indicating the pressing operation at the position of the confirmation button has been input in control section 760. If the confirmation button is not pressed (S1500: NO), ECU 700 proceeds to step S1600.

In step S1600, ECU 700 determines whether predetermined time has elapsed after determination of the backward movement of the vehicle. That is, in step S1100, ECU 700 starts to measure the time with a timer (not shown) in control section 760 to determine whether the measured time has reached the predetermined time. If the predetermined time does not elapse (S1600: NO), ECU 700 proceeds to step S1700.

In step S1700, ECU 700 determines whether the backward movement of the vehicle has been cancelled. That is ECU 700 determines whether ECU 700 has received the vehicle state signal indicating the cancel of backward movement, in control section 760. If the backward movement is not cancelled (S1700: NO), ECU 700 returns to step S1500.

If the predetermined time elapses (S1600: YES), ECU 700 proceeds to step S1800.

In step S1800, ECU 700 changes the alert level to a higher level, which is more unpleasant to the driver, and then proceeds to step S1700. That is, ECU 700 outputs, for example, an operation signal giving an instruction on switch to a larger sound output. This enables ECU 700 to attract a more careful attention of a driver who does not press the confirmation button even when the alert is issued and more effectively induce such a driver to watch the captured images. ECU 700 may select the alert level from among three or more levels depending on the elapsed time.

When the confirmation button is pressed (S1500: YES), ECU 700 proceeds to step S1900.

In step S1900, ECU 700 stops the display of the confirmation button and the issue of the alert, and then proceeds to step S1700. That is, ECU 700 stops the superimpose of the image of the confirmation button on the captured images and outputs the reporting signal giving an instruction on the cancel of alert in control section 760.

When the backward movement of the vehicle is cancelled (S1700: YES), ECU 700 proceeds to step S2000.

In step S2000, ECU 700 stops or cancels the display of the captured images and the confirmation button and the issue of the alert if such operations are continued. That is, in control section 760, ECU 700 stops the acquisition of the captured image data and stops the output of the display image signals if such operations are continued, and ECU 700 outputs the reporting signal giving an instruction on the cancel of alert if the alert is issued.

Then, upon receiving the instruction on the completion of process (S1200: YES), ECU 700 completes a Series of processes.

With these operations, ECU 700 can display the confirmation button on the screen displaying the captured images when the vehicle starts to move backward, and issue an alert to the driver until the driver presses the confirmation button on the screen.

As described above, monitoring system 100 of surrounds of a vehicle including the apparatus for monitoring surrounds of a vehicle according to the present embodiment does not cancel the alert issued to the driver until it receives driver's operation to cancel the alert through the screen displaying the captured images. Hence, the driver must direct his eyes to the captured images every time he starts to move the vehicle backward. That is, monitoring system 100 of surrounds of a vehicle always issues an alert to the driver regardless of detection of obstacles when the driver starts to move the vehicle backward. This enables monitoring system 100 of surrounds of a vehicle to ensure the safe operation of the vehicle compared to any conventional technique in which an alert is not issued when the apparatus fails to detect obstacles.

Furthermore, monitoring system 100 of surrounds of a vehicle may issue an alert for captured images showing areas in directions other than the area behind a vehicle in the same way as described above. For example, monitoring system 100 of surrounds of a vehicle may start to display captured images at the left side of the vehicle and the confirmation button and issue an alert when the vehicle starts to move ahead on the left. This effectively prevents occurrence of accidents in which a vehicle hit something at the left side when turning left.

Furthermore, the criterion of determination on the movement of a vehicle is not limited to the above example and monitoring system 100 of surrounds of a vehicle may employ any other criterion. For example, monitoring system 100 of surrounds of a vehicle may determine that a vehicle starts to move when the driver actuates the engine of the vehicle or touches the shift lever. That is, monitoring system 100 of surrounds of a vehicle may detect the actual start or stop of the vehicle movement and may detect driver's operations indicating the start or stop of the vehicle movement as a trigger of start or cancel of alert.

Monitoring system 100 of surrounds of a vehicle may continue to display images regardless of the movement of a vehicle.

Furthermore, information displayed on the screen and operations received through the screen by monitoring system 100 of surrounds of a vehicle are not limited to the above examples. For example, monitoring system 100 of surrounds of a vehicle may determine the image area and type of an obstacle by, for example, pattern matching for the captured images and may display a contour surrounding the image area of the obstacle and a text or symbol indicating the type of the obstacle as the confirmation button.

Furthermore, monitoring system 100 of surrounds of a vehicle may change the alert to any other alert such as a flashing light or vibration of the driver seat or the steering wheel, and may employ, for example, changes in intervals at which light flashes on and off or a change in intensity of vibration, in place of a change in the alert level. Alternatively, monitoring system 100 of surrounds of a vehicle may combine multiple types of alerts.

Furthermore, the alert issued by monitoring system 100 of surrounds of a vehicle may control the operations of a vehicle. For example, report section 600 may include a hand brake controller of the vehicle. In this case, control section 760 outputs a reporting signal giving an instruction on locking or unlocking of the hand brake to report section 600. For example, report section 600 includes a foot brake controller of the vehicle. In this case, control section 760 outputs a reporting signal giving an instruction on stop or cancel of stop of the vehicle to report section 600. For example, report section 600 includes an accelerator controller of the vehicle. In this case, control section 760 outputs a reporting signal giving an instruction on deceleration or cancel of deceleration of the vehicle to report section 600. In this case, monitoring system 100 of surrounds of a vehicle may issue an alert with sound, for example and, only when it detects an obstacle, may further control operations of the vehicle.

The disclosure of Japanese Patent Application No. 2010-64423, filed on Mar. 19, 2010, including the specification, drawings and abstract, is incorporated herein by reference in its entirety.

Industrial Applicability

The apparatus and method of monitoring surrounds of a vehicle according to the present invention can ensure the safe operation of the vehicle.

REFERENCE SIGNS LIST

100 monitoring system of surrounds of a vehicle
200 imaging section
300 vehicle condition detection section
400 external operation section
500 display section
600 report section
700 ECU
710 image input section
720 vehicle condition input section
730 external operation signal input section
740 image output section
750 report output section
760 control section.

The invention claimed is:

1. An apparatus for monitoring surrounds of a vehicle, comprising:
   a report output section that activates a report section to issue an alert directed to a driver in the vehicle provided that the vehicle starts to move and regardless of detection of obstacles; and
   a control section that causes a display item and images to be displayed together on a screen in the vehicle when the vehicle starts to move, the display item being displayed to receive a cancelling operation of the alert, the images being based on captured image data of the surrounds of the vehicle,
   wherein the control section randomly determines a display position of the display item to receive the cancelling operation of the alert, and causes the display item to receive the cancelling operation of the alert to be displayed at a corresponding random position of the screen.

2. The apparatus for monitoring surrounds of a vehicle according to claim 1, wherein:
   the images are captured images of an area behind the vehicle, and
   the report output section activates the report section when the vehicle starts to move backward.

3. The apparatus for monitoring surrounds of a vehicle according to claim 1, wherein the alert changes with an elapsed time after the vehicle started to move.

4. The apparatus for monitoring surrounds of a vehicle according to claim 1, wherein the alert includes output of sound, vibration, or light.

5. The apparatus for monitoring surrounds of a vehicle according to claim 1, wherein the alert includes stop of the vehicle.

6. A method of monitoring surrounds of a vehicle, comprising:
   activating a report section to issue an alert directed to a driver in the vehicle provided that the vehicle starts to move and regardless of detection of obstacles; and
   randomly determining a display position of a display item and causing the display item and images to be displayed together on a screen in the vehicle when the vehicle starts to move, the display item being displayed to receive a cancelling operation of the alert, the images being based on captured image data of the surrounds of the vehicle, and wherein randomly determining the display position of the display item and causing the display item to be displayed to receive the cancelling operation of the alert includes causing the display item to be displayed at a corresponding random position of the screen.

7. The apparatus for monitoring surrounds of a vehicle according to claim 1, wherein the report output section activates the report section to issue the alert provided that the vehicle starts to move backward and regardless of detection of obstacles.

8. The method of monitoring surrounds of a vehicle according to claim 6, wherein the activating activates the report section to issue the alert provided that the vehicle starts to move backward and regardless of detection of obstacles.

* * * * *